US00RE46367E

(19) United States
(12) Reissued Patent
Estrada et al.

(10) Patent Number: US RE46,367 E
(45) Date of Reissued Patent: Apr. 18, 2017

(54) THERAPY MAT TABLE AND TABLE CARRIER AND METHODS OF USE

(71) Applicant: Therapeutic Industries, Inc., Thousand Palms, CA (US)

(72) Inventors: Edward Estrada, Anaheim, CA (US); Christian D. Lehuede, Thousand Palms, CA (US)

(73) Assignee: Therapeutic Industries, Inc., Thousand Palms, CA (US)

(21) Appl. No.: 14/955,245

(22) Filed: Dec. 1, 2015

Related U.S. Patent Documents

Reissue of:
(64) Patent No.: 8,595,871
Issued: Dec. 3, 2013
Appl. No.: 13/420,309
Filed: Mar. 14, 2012

U.S. Applications:
(63) Continuation of application No. 12/803,198, filed on Jun. 21, 2010, now Pat. No. 8,161,587, which is a (Continued)

(51) Int. Cl.
*A61G 7/015* (2006.01)
*A61G 13/08* (2006.01)

(Continued)

(52) U.S. Cl.
CPC ..... *A61G 13/08* (2013.01); *A61G 7/053* (2013.01); *A61G 7/08* (2013.01); *A61G 2200/32* (2013.01);

(Continued)

(58) Field of Classification Search
CPC ..... A61G 7/1096; A61G 7/053; A61G 1/013; A61G 3/06; A61G 5/06

(Continued)

(56) References Cited

U.S. PATENT DOCUMENTS 1,708,630 A 4/1929 MacIntosh
3,138,805 A * 6/1964 Piazza ..... A61G 5/00 297/411.34

(Continued)

OTHER PUBLICATIONS

Office Action dated Mar. 5, 2010, in U.S. Appl. No. 12/031,596, filed Feb. 14, 2008.

(Continued)

*Primary Examiner* — Cary Wehner
(74) *Attorney, Agent, or Firm* — Vierra Magen Marcus LLP

(57) ABSTRACT

A therapy mat table has an upper surface and removable mat. A portion of the mat and a separate plate is rotatably mounted within the flat top so as to be capable of being selectively raised and lowered to form a seat back for a patient reclining or sitting on the pad on an elongated side edge of the table. The table may also include transfer bars which help to move a patient on and off the table or when moving to a standing position or while simply standing. The table may further include a stowable foot stop, which prevents backward movement of the patient's feet when the patient is standing between the transfer bars. The table may also include a knee blocker, which helps to limit or prevent buckling of the patient's knees when the patient is standing between the transfer bars.

20 Claims, 16 Drawing Sheets

Related U.S. Application Data continuation-in-part of application No. 12/459,946, filed on Jul. 8, 2009, now abandoned, and a continuation-in-part of application No. 12/031,596, filed on Feb. 14, 2008, now abandoned.

(51) Int. Cl.
*A61G 7/08* (2006.01)
*A61G 7/053* (2006.01)

(52) U.S. Cl.
CPC ..... *A61G 2200/34* (2013.01); *A61G 2200/36* (2013.01)

(58) Field of Classification Search
USPC ..... 5/3, 612–614, 616–619, 624, 633–635, 5/662; 482/66, 41; 601/24, 49; 297/423.11
See application file for complete search history.

(56) References Cited

U.S. PATENT DOCUMENTS 3,739,793 A * 6/1973 Wilson ..... A47K 17/026 135/67
3,929,330 A * 12/1975 Cerasoli ..... 482/42
D250,043 S 10/1978 Shine
4,198,045 A 4/1980 Miller
4,240,169 A * 12/1980 Roos ..... A61G 3/06 297/DIG. 4
4,356,578 A 11/1982 Clark
4,387,888 A 6/1983 Marinakis
4,655,200 A 4/1987 Knight
4,809,804 A * 3/1989 Houston ..... A61G 5/14 180/65.51
4,852,193 A 8/1989 Alsip et al.
4,856,128 A 8/1989 Alsip et al.
4,866,796 A 9/1989 Robinson et al.
4,920,589 A 5/1990 LaVelle et al.
4,924,537 A 5/1990 Alsip et al.
4,944,054 A 7/1990 Bossert
5,152,024 A 10/1992 Chrones et al.
5,253,639 A 10/1993 Johnston
5,303,437 A 4/1994 Hung
5,362,302 A 11/1994 Jensen et al.
5,435,028 A * 7/1995 Frala ..... A61G 7/053 135/66
5,471,689 A * 12/1995 Shaw ..... A61G 7/0536 5/426
5,477,570 A 12/1995 Hannant et al.
5,919,131 A 7/1999 Smoler et al.
5,950,262 A 9/1999 Smoler et al.
6,101,647 A 8/2000 Stroud et al.
6,123,392 A 9/2000 Alfred et al.
D434,151 S 11/2000 Fanuzzi
6,163,904 A 12/2000 Royston
6,272,702 B1 * 8/2001 Uchida ..... A61G 5/006 5/600
6,276,011 B1 8/2001 Antinori
6,277,141 B1 8/2001 Lake
6,343,802 B1 * 2/2002 Workman et al. ..... 482/68
7,024,711 B1 4/2006 Stasney et al.
8,161,587 B2 4/2012 Estrada et al.
8,595,871 B2 12/2013 Estrada et al.
2001/0029629 A1 * 10/2001 Tsuji et al. ..... 5/618
2002/0029419 A1 * 3/2002 Weil et al. ..... 5/601
2003/0015853 A1 1/2003 Hanson et al.
2003/0017925 A1 1/2003 Hoffman
2004/0107519 A1 * 6/2004 Grody ..... A61G 3/061 14/69.5
2005/0120485 A1 * 6/2005 Sebastien ..... A61G 7/053 5/662
2006/0236458 A1 10/2006 Barthelt
2006/0293156 A1 * 12/2006 Trees ..... 482/148
2007/0157385 A1 * 7/2007 Lemire et al. ..... 5/600
2008/0172789 A1 * 7/2008 Elliot et al. ..... 5/616
2011/0009903 A1 1/2011 Estrada

OTHER PUBLICATIONS

Office Action dated Apr. 14, 2011, in U.S. Appl. No. 12/459,946, filed Jul. 8, 2009.
Office Action dated Oct. 14, 2014, in U.S. Appl. No. 14/094,788, filed Dec. 3, 2013.

* cited by examiner

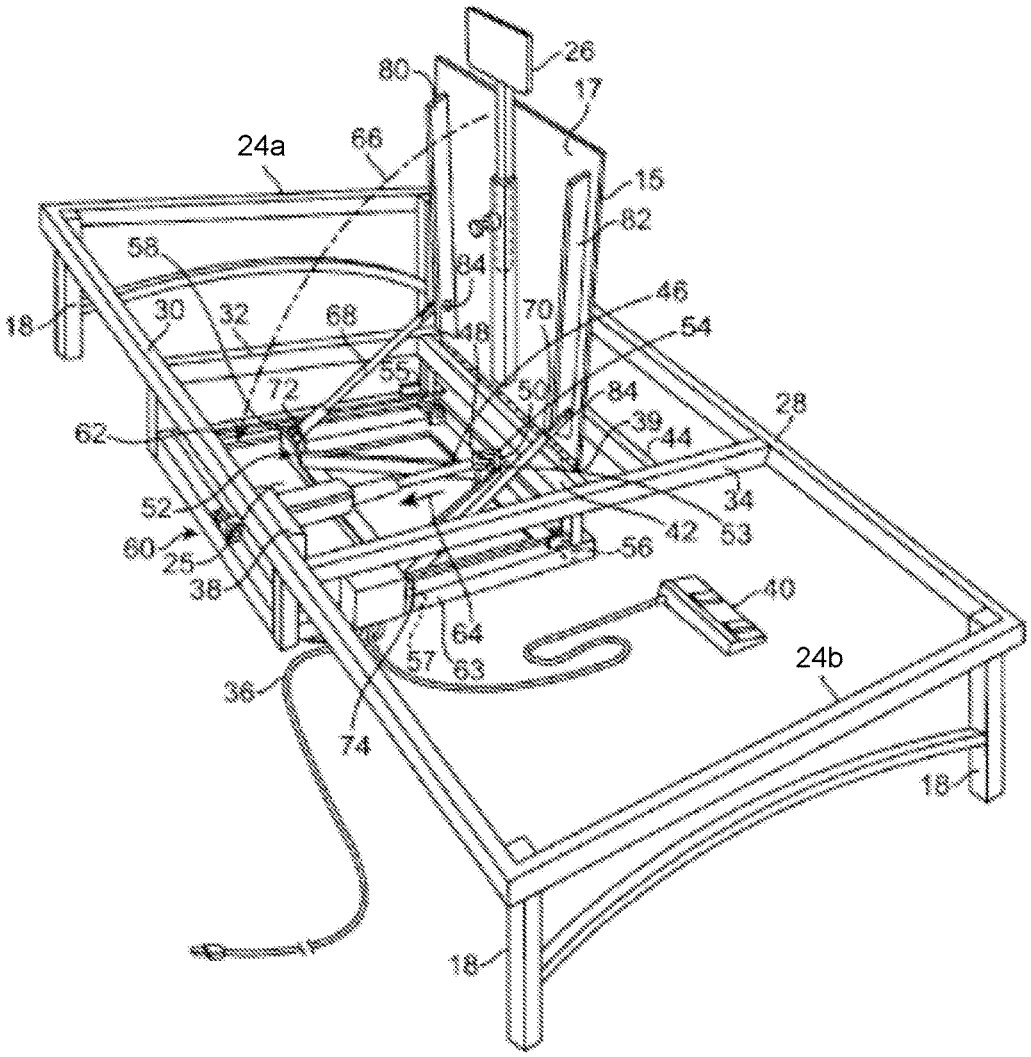
FIG. 2
(AMENDED)

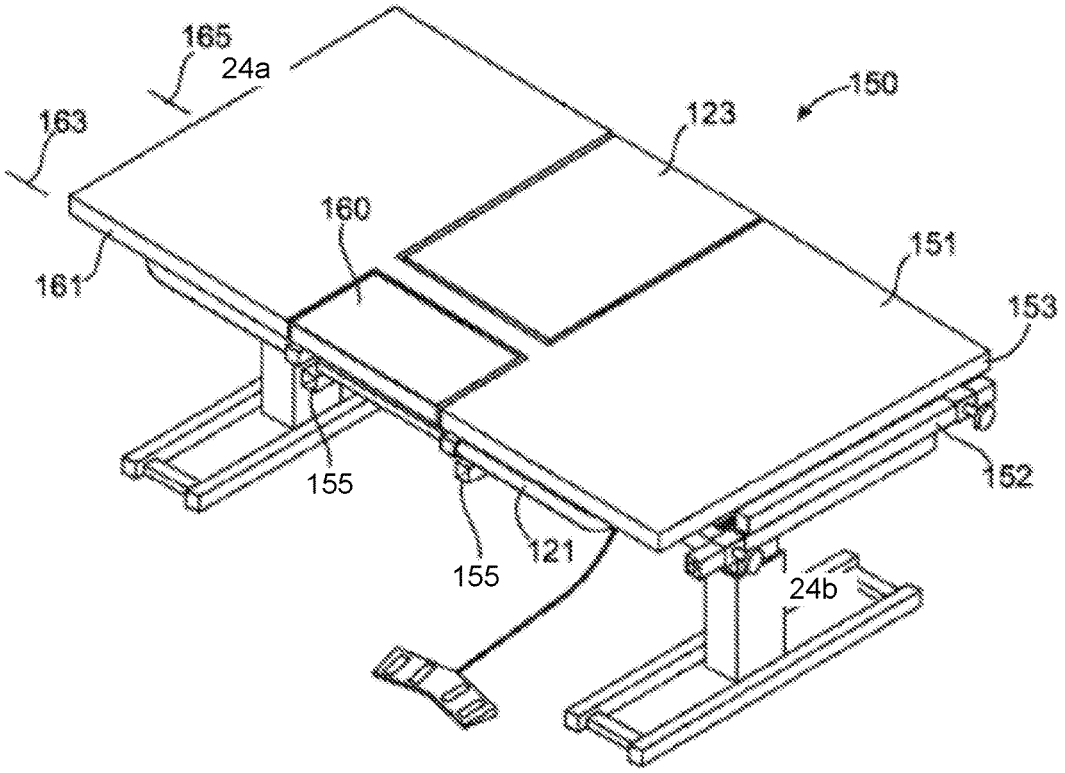
FIG. 11
(AMENDED)

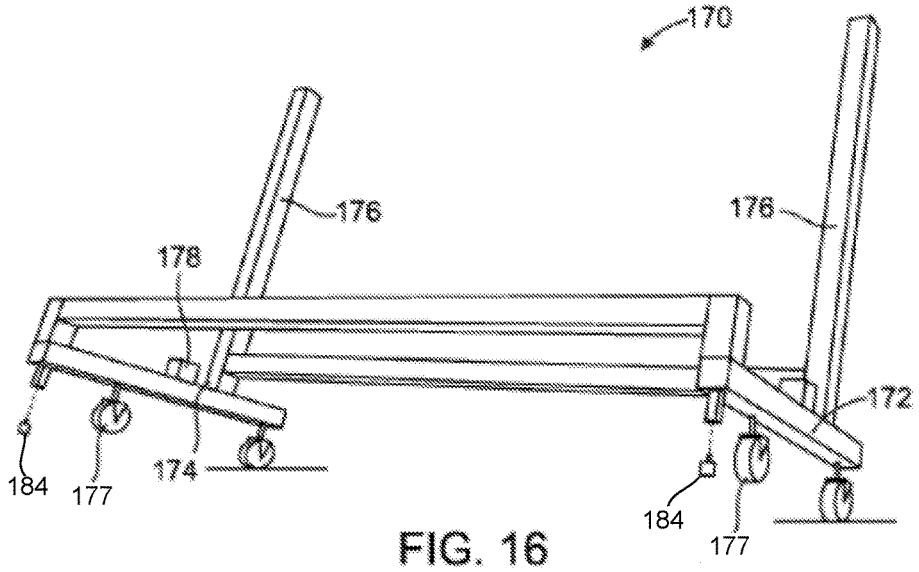
FIG. 16
(AMENDED)

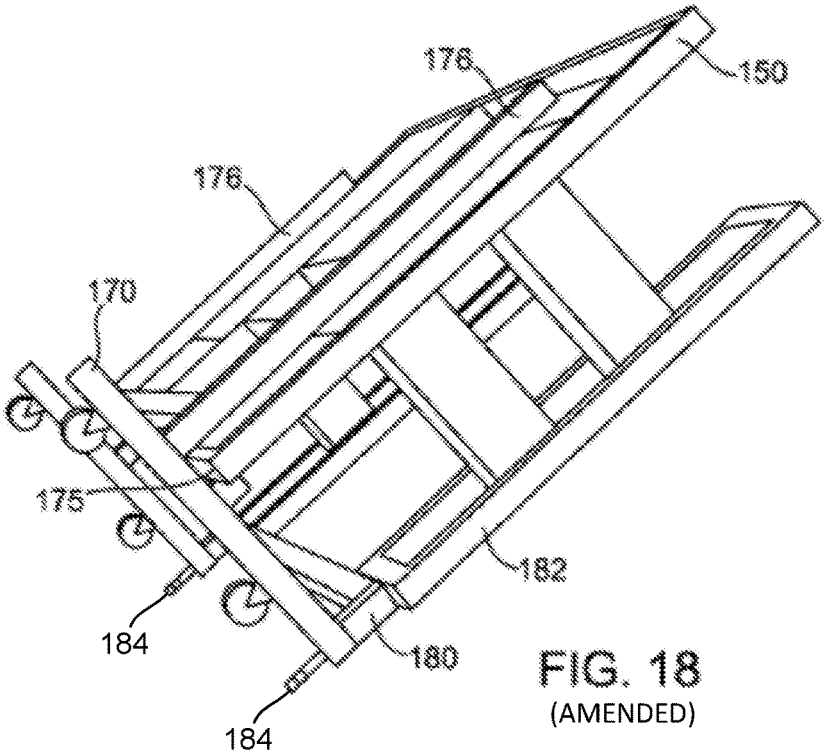
FIG. 18
(AMENDED)
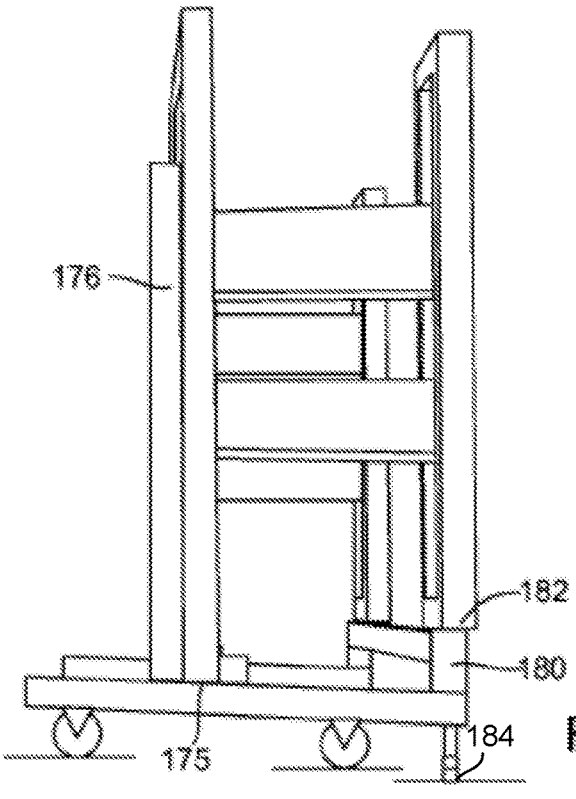
FIG. 19
(AMENDED)

THERAPY MAT TABLE AND TABLE CARRIER AND METHODS OF USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation of U.S. application Ser. No. 12/803,198, filed on Jun. 21, 2010, now U.S. Pat. No. 8,161,587. The entire disclosure of which is hereby incorporated by reference for all intents and purposes.

BACKGROUND

This invention pertains to therapy tables in general, and, in particular, to an improved therapy mat table for use in physical therapy having an adjustable portion that may be selectively raised or lowered to form a raised area that may be used as a seat back to more comfortably support patients.

It has long been appreciated that when performing physical therapy on or providing physical therapy to an individual; the individual must lie on or be supported by a table having a mat thereon that comfortably supports the individual during adjustment or articulation of selected portions of the individual's body. Some of the known therapy tables include separate table portions or sections that are movable independently from each other to enable a human body to be placed in various positions on the table top. For example, the table top may include articulated torso and leg portions for use in adjusting a person's spinal column.

While the known tables encompass a wide variety of movable sections or portions, there is a dearth in the prior art of tables having movable portions that may be selectively raised to better support a patient's back when seated on the table during some types of physical therapy. Typically, the therapist herself must support the patient's weight, which can be tiring to the therapist and can even lead to injuries and in particular back injuries.

Another problem with conventional therapy tables is that the therapist must also assist the patient onto the table often with little assistance from the patient.

SUMMARY

In accordance with the device of the present application, a therapy mat table is provided with a portion that may be automatically raised or lowered, as needed, to enable a patient to lie or sit on the table with a support for the patient's back.

In one exemplary embodiment, the therapy mat table of the present application comprises a table having a flat top supported by a plurality of upstanding legs. The table has an upper surface with a removable cover, mat or pad to allow a patient to lie comfortably on the table top. A portion of the table top is rotatably mounted within the flat top so as to be capable of being selectively raised and lowered to form a raised portion or seat back for a patient reclining or sitting on the pad. The movable portion may be remotely actuated by a motor mounted under the table top, or may be manually actuated by a crank, rack and pinion type drive, or the like.

If a motor is used, it is preferably connected to an operating means to selectively operate an operating mechanism, such as a directly connected mechanical or hydraulic arrangement connected between the bottom of the table top and the movable portion thereof.

In another exemplary embodiment of the device of the present application, the table includes a body having a substantially flat top with a pair of relatively narrow ends and elongated side edges supported by a plurality of upstanding legs. A plurality of cross beams may be connected between the elongated side edges. The table has an upper surface supported on the relatively narrow ends, elongated side edges and cross beams, with a removable cover, mat or pad covering the upper surface to allow a patient to lie comfortably on the table top. A portion of the upper surface is rotatably mounted within a pair of the cross beams so as to be capable of being selectively raised and lowered to form a seat back for a patient reclining or sitting on the pad and facing one of the elongated side edges of the table. The movable portion may be remotely actuate by a motor mounted under the table top, or may be manually actuated by a crank or the like.

A reversible electric or hydraulic motor is preferably mounted to one or more of the plurality of cross beams, under the lower surface of the flat top, and operatively connected to a hydraulic cylinder to move a carriage or the like along tracks, the carriage is connected to a movable portion or seat back, to selectively rotate the movable portion between raised and lowered positions. The carriage is movably mounted on wheels held in the tracks.

In another aspect of the present invention, the therapy table may also include a pair of transfer bars, which may be used to assist moving the patient on and off the table. The transfer bars may be stowed beneath the table when not in use. The transfer bars may be positioned to support the patient when moving to and from a seated position using the movable seat back. The table may also include a foot stop, which prevents the patient's feet from excessive inward movement when moving to a standing position. The foot stop may be aligned with a lateral edge of the table to assist the patient when moving to a standing position from the seated position.

In still another aspect of the present invention, the therapy table may also have a knee block. The knee block helps to prevent, or at least limit, buckling of the patient's knees as the patient moves toward the standing position. The knee block may be supported by the transfer bars and stowed beneath the table when not in use. The knee block has an adjustable position to accommodate different sized patients. The knee block and transfer bars, together with a lateral edge of the table, form an enclosure which helps to stabilize the patient and prevent the patient from falling in any direction.

In still another aspect of the present invention, a pair of removable parallel bars may be provided. A movable patient support may also be provided which is slidably coupled to the parallel bars.

In yet another aspect of the present invention, a table carrier is provided. The table carrier traps a lateral edge of the table in a recess and engages a base of the table. Once the lateral edge has been trapped and the base engaged, the table is raised to a substantially perpendicular position.

A better understanding of the above and many other features and advantages of the device of the present application may be obtained from a consideration of the detailed description thereof below, particularly if such consideration is made in conjunction with the figures of the appended drawings.

The details of one or more embodiments of the invention are set forth in the accompanying drawings and the description below. Other features, objects, and advantages of the invention will be apparent from the description and drawings, and from the claims.

DESCRIPTION OF DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

FIG. 2 is a further perspective view of the therapy mat table, with the table top and mat removed and a lower plate portion of the seat back shown in the raised position.

FIG. 11 shows another therapy table with a movable seat.

FIG. 16 shows a table carrier.

FIG. 18 shows the table carrier supported on rubber feet as the table is raised.

FIG. 19 shows the wheels engaging the ground with the table ready for transport.

DETAILED DESCRIPTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for a novel and improved therapy mat table having a selectively movable internal portion to form a back rest.

Figure 1:
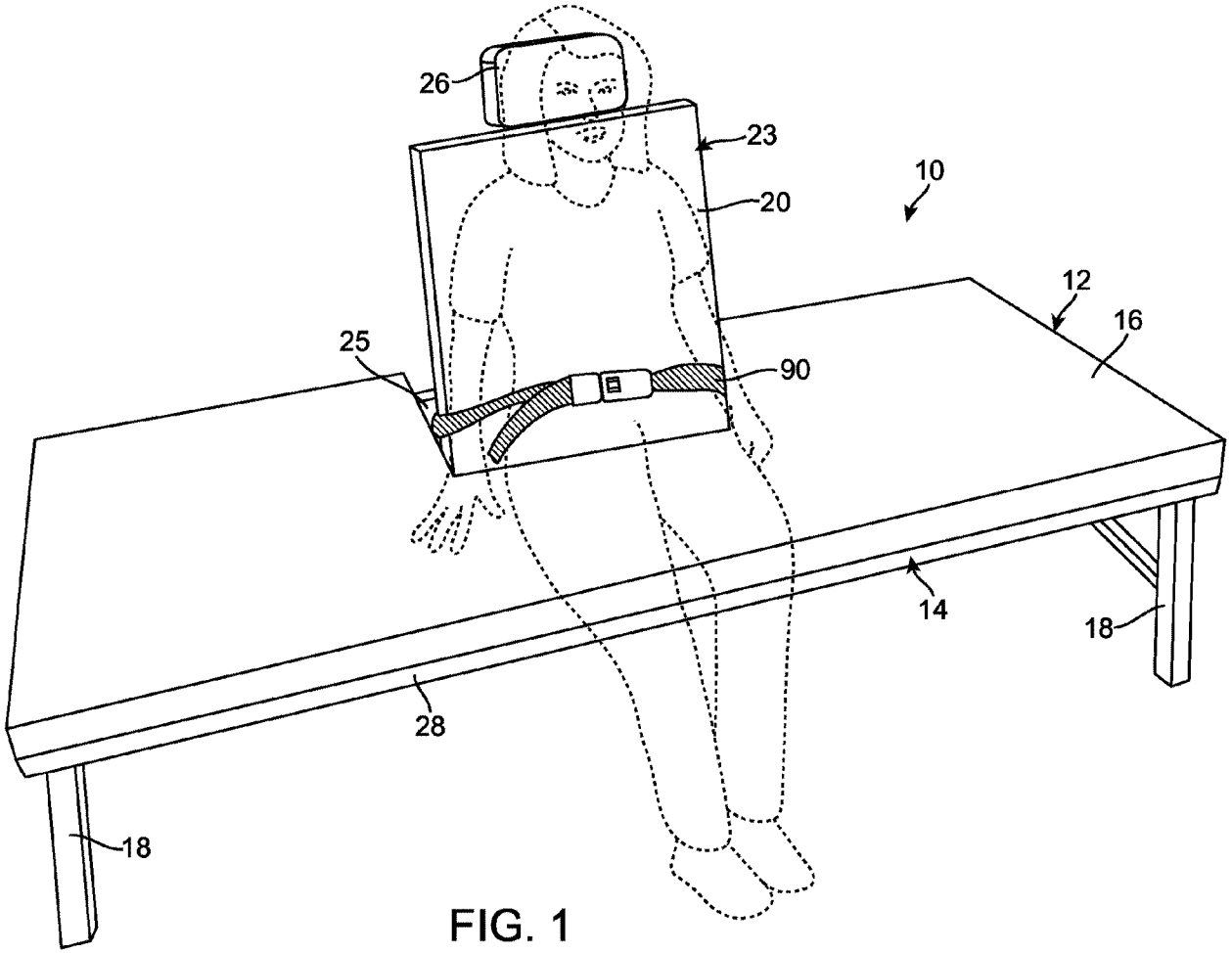
FIG. 1 is a top-side perspective view of an exemplary embodiment of a therapy mat table in accordance with the present invention, with the movable portion or seat back shown in the raised position in the top with a patient shown in broken line, seated on a side edge of the table and held thereon by a seat belt in a supported position.
Figure 3:
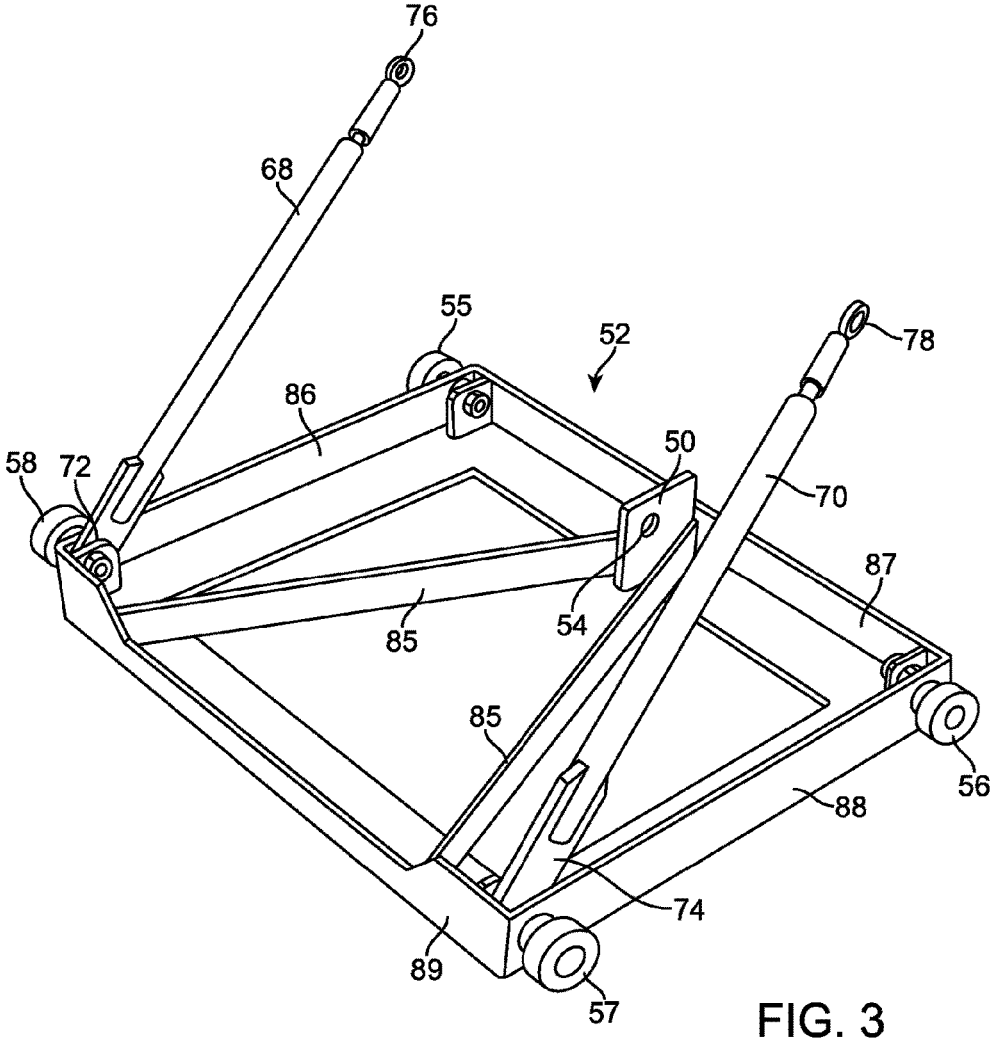
FIG. 3 is an enlarged partial perspective view of the hydraulically operated carriage for raising and lowering the movable plate or portion of the seat back of the therapy mat table.

An exemplary embodiment of a therapy mat table 10 is illustrated in the perspective and enlarged partial views of FIGS. 1, 2 and 3 of the drawings, and comprises a body 12 having a substantially flat top 14 covered by a mat or pad 16. The substantially flat top 14 and mat 16 are supported by a plurality of upstanding legs 18. The flat top 14 includes an upper surface on which the mat or pad 16 rests or is supported and a lower surface. A movable portion or seat back 23 is disposed in the mat 16. The seat back 23 may be formed completely in the interior of the mat 16 or may extend to one side edge, as shown, to allow the seat back to be made larger and to include an adjustable head rest 26 thereon. The seat back 23 is preferably comprised of cut-out portion or section 20 of the mat 14 held on or mounted over a plate 15.

The movable plate 15 is best shown in FIG. 2. This plate 15, which may be a separate item or a cutout portion of the flat top 14, has the section 20 of the mat or pad 16 secured to an upper surface thereof in any desired or known manner, such as by an adhesive or releasable securing means. The movable seat back 23 is raised or lowered by movement of the plate 15. The movable seat back 23 forms a back rest for a patient sitting or reclining on the top surface of the therapy mat table 10, as shown in broken line in FIG. 1. The headrest 26 is preferably secured to the rear of the plate 15 and adjustable so as to be behind the plate 15, adjacent a rear surface 17, when the seat back 23 is lowered, and above the seat back, to support the head of a patient, when the seat back is raised, as shown in FIG. 1. The rear surface 17 of the plate 15 preferably covers an internal opening 25 formed in the table top 14.

The body 12 includes relatively narrow opposed ends [24, 26] *24a, 24b* and substantially parallel, elongated side edges 28, 30 supported by the upstanding legs 18. The relatively narrow opposed ends [24, 26] *24a, 24b* and substantially parallel, elongated side edges 28, 30 include upper surfaces for supporting the edges of the mat 16. The legs 18 may have further supports or braces connected thereto. At least two cross beams 32, 34 are disposed or secured between the elongated side edges 28, 30, with the internal opening 25 formed there between, and to further strengthen the table, aid in supporting the mat 16 and to provide support to the movable plate or portion 15 and its operating mechanism, as described more fully below. If desired, the substantially flat top 14 may have a further flat surface added thereto, to add support for the mat 16.

In the exemplary preferred embodiment of the therapy mat table 10 illustrated, a seat back operator 38, such as a reversible electric or hydraulic motor, or combination electrical hydraulic motor is supported in or adjacent to the opening 25, preferably between and by the cross beams 32, 34, under the lower surface 17 of plate 15, when in the lowered position. The operator 38 is connected to a power source, such as an electrical outlet, by a cord 36 system and is preferably actuated by a remote control 40 to move the plate 15 and, therefore, the seat back 23, between raised and lowered positions, including any desired intermediate position. The plate 15 is rotatably held at one end, as by means of a hinge or the like 39 held on an arm or strut 42, disposed or extending between the cross beams 32, 34, and forming one end of the opening 25. A further or second arm or strut 44 may also be disposed or extend between the cross beams 32, 34, adjacent the first arm or strut 42. The operator 38 has a shaft 46 operatively connected thereto by a first end (not shown) held in the operator. A second end 48 of the shaft 46 is held to a plate 50 secured in a carriage or housing 52, as by means of pin or the like 53, passing through an opening 54. The carriage or housing 52 has a plurality of rollers or wheels 55, 56, 57, 58 rotatably mounted at outer corners of the housing.

The carriage or housing 52 is preferably mounted and held in a frame 60 secured to the cross beams 34, 36, under the same, away from the lower surface 17 of the plate 15. The frame 60 includes tracks 62, [64] *63* in which the plurality of rollers or wheels 55, 56, 57, 58 are held or mounted whereby the carriage or housing 52 may be selectively moved along or translated along the tracks 62, [64] *63* by rolling of the wheels 55, 56, 57, 58, upon actuation of the shaft [48] *46* to the position shown in FIG. 1, to raise the plate 15 and the seat back 23. The seat back is lowered and raised by the action of a pair of levers 68, 70 rotatably secured at first ends 72, 74 to rear corners of the carriage 52 and at second or outer ends 76, 78 to brackets or plates 80, 82 secured to the rear surface 17 of plate 15, as by means of securing elements 84 held in the plates 80, 82, as shown in FIG. 1.

Upon actuation of the shaft 46 in the direction of arrow 64, the plate 15 and the seat back 23 will be lowered or moved in the direction of arrow 66. The carriage or housing 52 also includes further supports or braces 85 and may have upwardly extending side edges 86, 87, 88, 89 to strengthen the same and to hold the wheels 55, 56, 57, 58 thereon.

In the exemplary preferred embodiment shown, means may be provided for selectably actuating the operator 38 in case the power is off, for any reason. For example, the operator 38 could be manually operated by a crank or a pump in a known manner.

In the particular embodiment illustrated, the plate 15 is preferably operated by the operator 38 to enable the seat back 23 to be raised and lowered in the therapy mat table 10. In the raised position the seat back 23 faces the elongated side edge 28 of the body 12, whereby a patient sitting on the table top, along the side edge 28, a shown in FIG. 1, will have their back supported in the preferred upright position needed when performing some types of physical therapy. The patient may have a seat belt 90, held in the table by any desired means, as by being held to the rear surface 17 of the plate 15 by securing elements, snapped around their waist, to aid in keeping them in the seated position during therapy.

As discussed above, the operator 38 may be an electrically operated motor or may comprise a combination hydraulic-electric motor, or may be a hydraulically actuated motor actuated by a hydraulic system to move the plate 15 and seat back 23 between raised and lowered positions.

Figure 7:
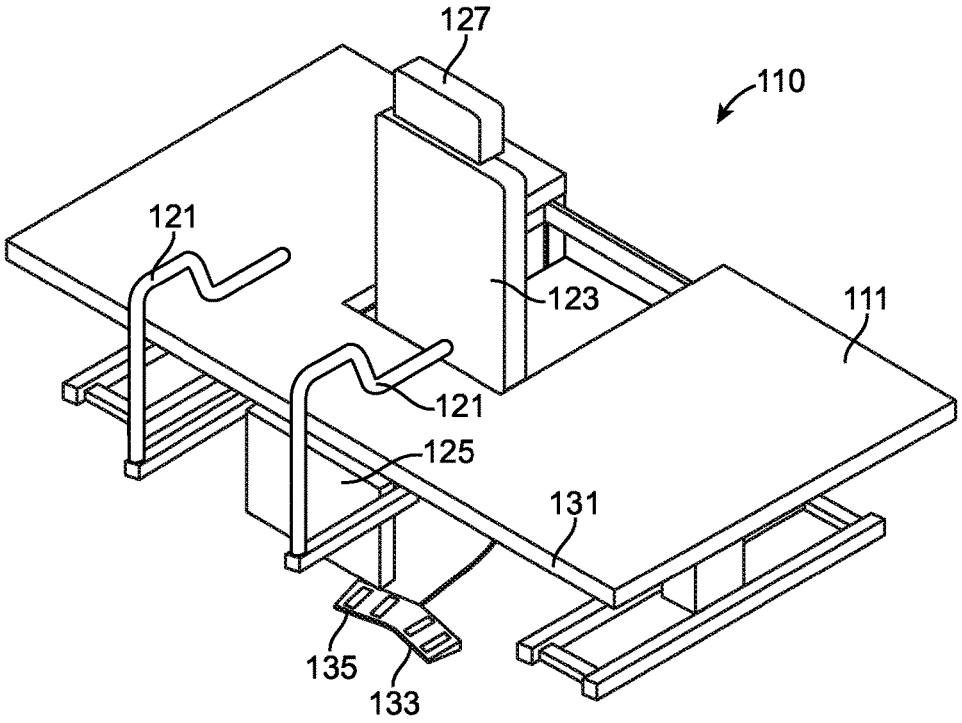
FIG. 7 shows the transfer bars moved outwardly from the table relative to the position of FIG. 6.

Referring to FIGS. 4-8, another therapy mat table 110 is shown. The therapy mat table 110 has a movable seat back 123 and a pair of transfer bars 121. The seat back 123 includes a deployable headrest 127 to support the patient's head. A belt (not shown) is provided to secure the patient in the seated position as described above. The transfer bars 121 may be used to aid the patient on and off the table 110 and may be used by the patient or the therapist. The transfer bars 121 are movable from the stowed position of FIG. 4 to the working position of FIG. 5. The transfer bars 121 initially rotate to an orientation parallel to the table 110 and then slide beneath the table 110 to the stowed position of FIG. 5. The transfer bars 121 are positioned to the left and right of a seat 129 formed in a mat 111 when the seat back 123 is deployed so that the bars 121 may be used to help the patient move to and from the seated position. The position of the transfer bars 121 may be adjusted to move the transfer bars 121 closer or further from the table 110 to accommodate differing size patients. FIG. 7 shows the transfer bars 121 moved further from the table 110 compared to the position of FIG. 6.

Figure 4:
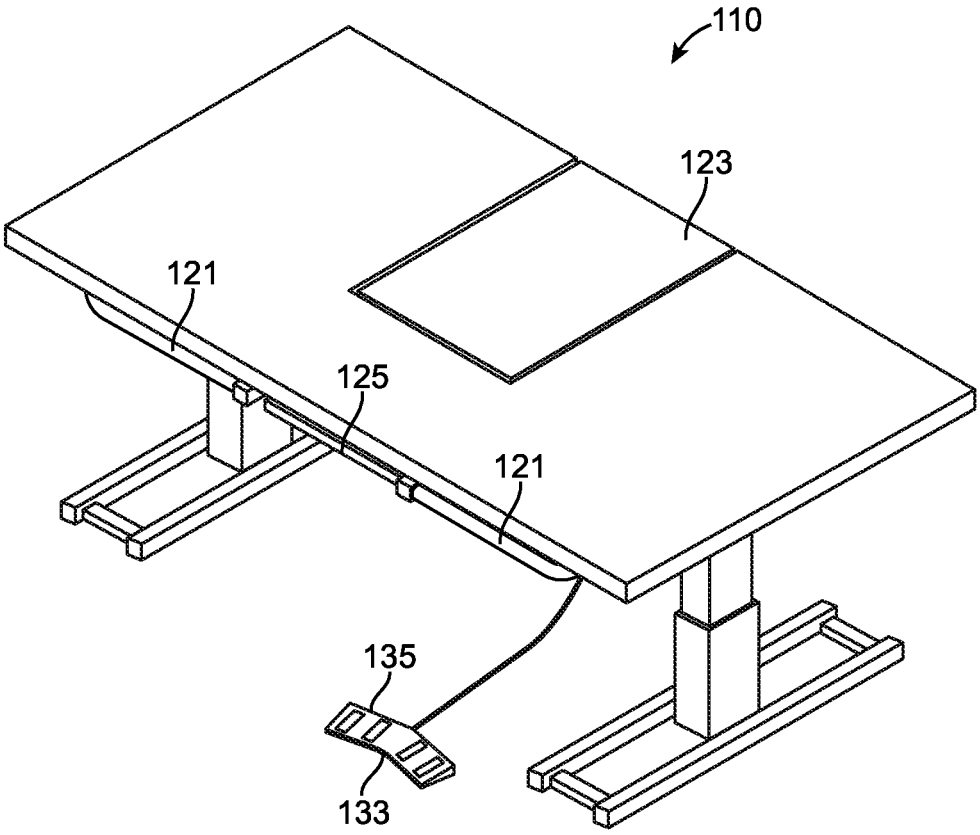
FIG. 4 is a perspective view of another therapy mat table which has stowable transfer bars, foot stop and knee block all shown in the stowed position.
Figure 5:
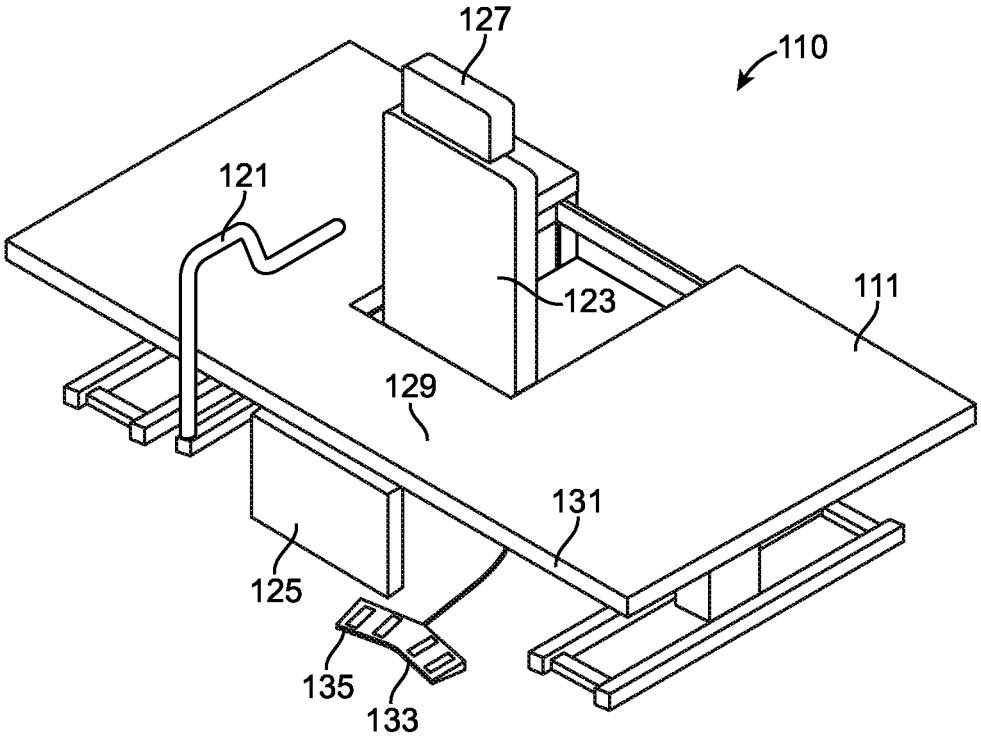
FIG. 5 is another perspective view of the therapy mat table of FIG. 4 with one of the transfer bars and the foot stop in the working positions.
Figure 6:
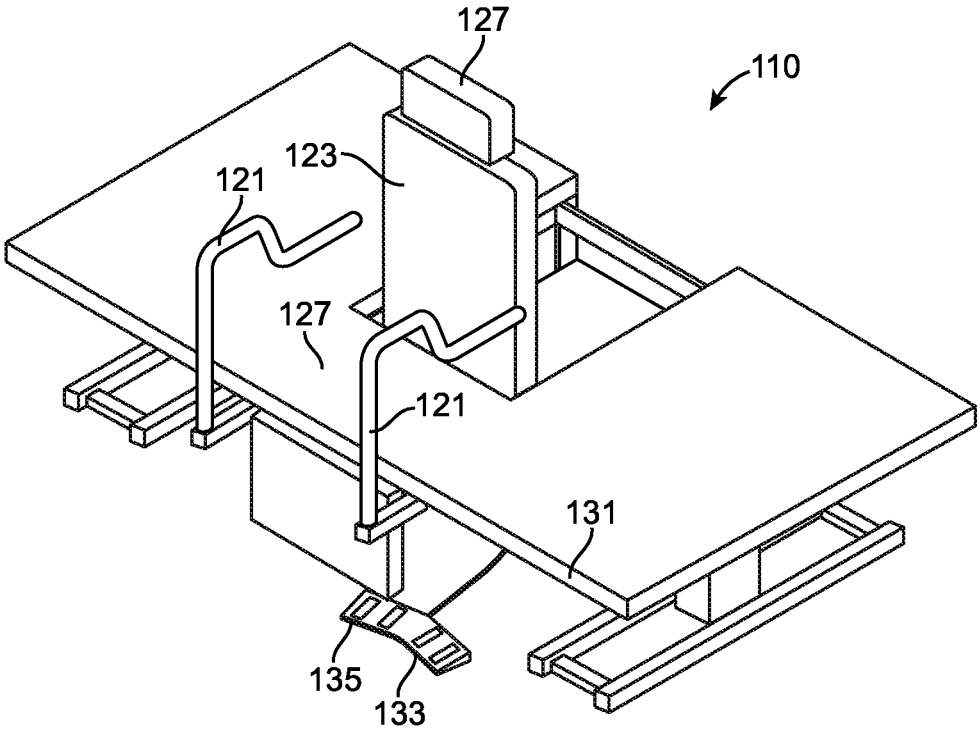
FIG. 6 shows both transfer bars in the working position.

The therapy mat table 110 also includes a foot stop 125 which is movable from the stowed position of FIG. 4 to the working position of FIG. 5. The foot stop 125 may be useful in preventing excessive inward movement of the patient's feet when the patient moves on or off the table 110 and in particular from the seated position. The foot stop 125 is aligned with a lateral edge 131 of the table 110 adjacent to the transfer bars 121 in the working position. The foot stop 125 moves away from the lateral edge in the stowed position and is stowed beneath the table 110.

The table 110 may also be raised and lowered by activation of foot pedal 133. Activation of the seat back 123 may also be automated and activated with foot pedal 135. The mechanism by which the seat back 123 is raised and lowered may be similar to the mechanism described above or may be any other suitable mechanism without departing from the scope of the invention.

Figure 8:
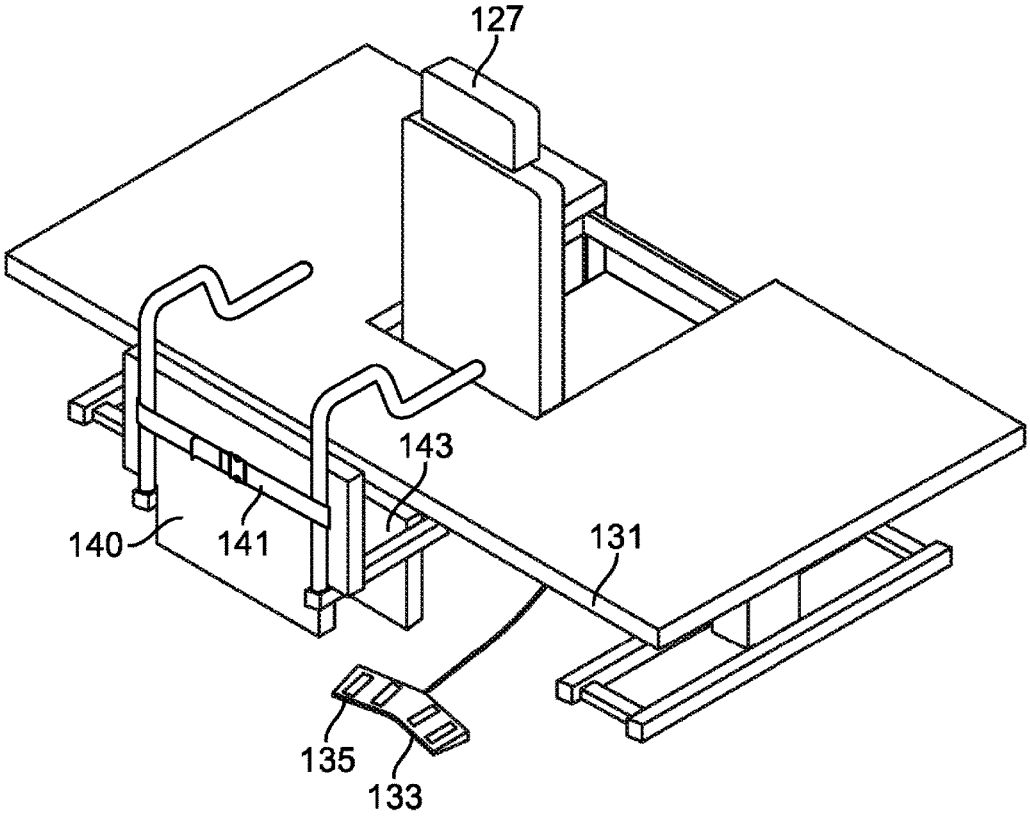
FIG. 8 shows the knee block positioned between the transfer bars.
Figure 9:
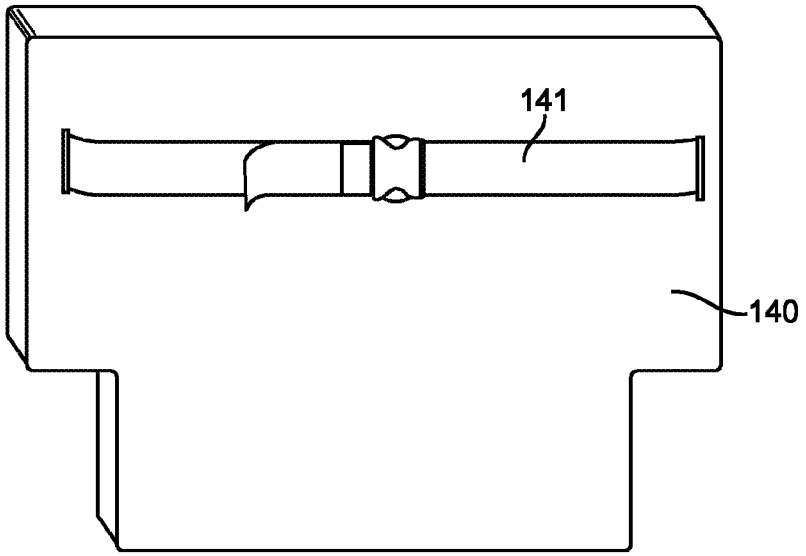
FIG. 9 shows the knee block.
Figure 10:
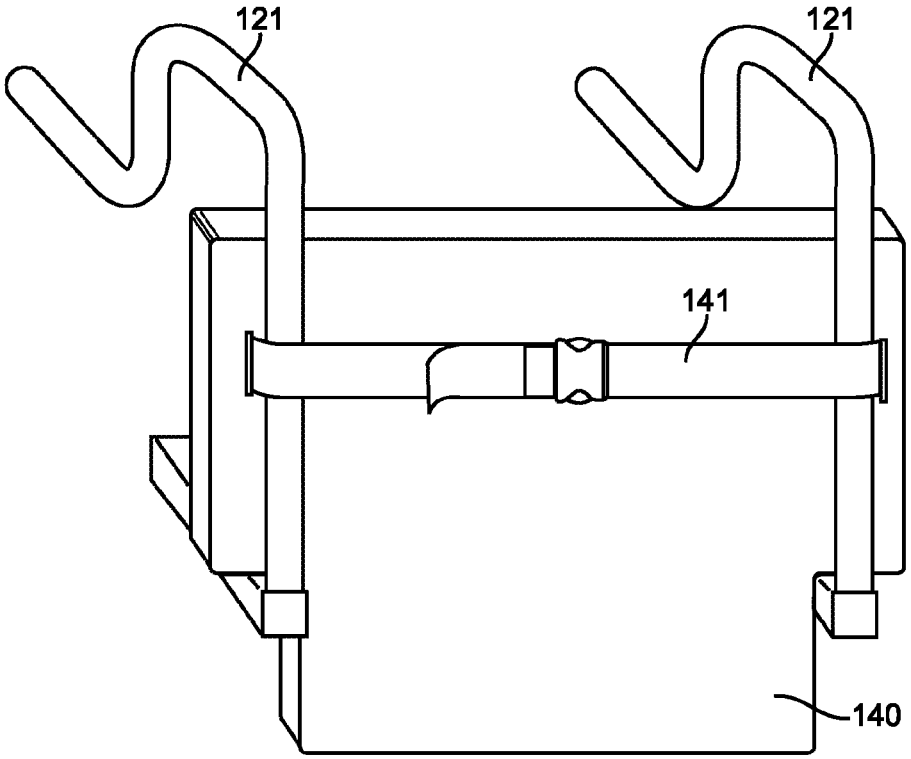
FIG. 10 shows the knee block attached to the transfer bars.

Referring now to FIGS. 8-10, the table 110 may also include a knee block 140 which helps to reduce the likelihood of the patient's knees buckling and limit's the amount that the knees can move even if the patient's knees should buckle. The knee block 140 is supported by the transfer bars 121 and may be stowed under the table when not in use. The knee block 140 is particularly advantageous when used with the table 110 in the manner described below to move a patient to a standing position. The knee block 140 is secured to the transfer bars 121 with a strap 141. The position of the knee block 140 may be adjusted by changing the position of the transfer bars 121. In this manner, the space enclosed by the transfer bars 121 and the knee block 140 may be adjusted to accommodate the particular patient. Typically, the knee block 140 is adjusted so that the patient will fit snugly in an enclosure 143 formed by the knee block 140, transfer bars 121, the edge of the table 131 and the foot stop 125.

The patient is moved from the table 110 to a standing position in the following manner. First, the patient is moved to the edge of the table 110 and positioned in a seated position using the seat back 123 as described herein. The transfer bars 121 and foot stop 125 are moved to the working positions and the knee block 140 is then positioned between the transfer bars 121. The position of the knee block 140 may be adjusted to adjust the distance between the knee block 140 and the lateral edge 131 of the table by adjusting the position of the transfer bars 121. Typically, the knee block 140 is adjusted to a position to form an enclosure 143 which is just large enough to accommodate the patient.

The table 110 is then slowly raised so that the patient begins to move to the standing position. The knee block 140 prevents the patient's knees from buckling and the foot stop 125 prevents the patient's feet from excessive backward displacement as the patient moves to the standing position. Once the patient is standing, the therapist may work on the patient or the patient may simply maintain a standing position as the therapy itself. An advantage of the knee block 140 is that the therapist must typically support the patient herself and, if the patient's knees should buckle, the therapist must stabilize the patient by herself, which presents obvious problems for the therapist and patient. Another advantage of the transfer bars 121 and the knee block 140 is that the patient is essentially contained within the enclosure 143 formed by the side of the table 131, transfer bars 121 and knee block 140.

Referring to FIGS. 11-15, another table 150 is shown which includes all of the features of table 110 and all such features and methods of use are expressly incorporated here including the seat back 123, the transfer bars 121 and the knee block 140 even if those items not explicitly shown here. The table 150 includes a table top 151 and a mat 153 which supports a patient in a lying position. The table top 151 may be lowered and raised as discussed above and includes a movable seat back 123 which may also be used as discussed above.

Figure 12:
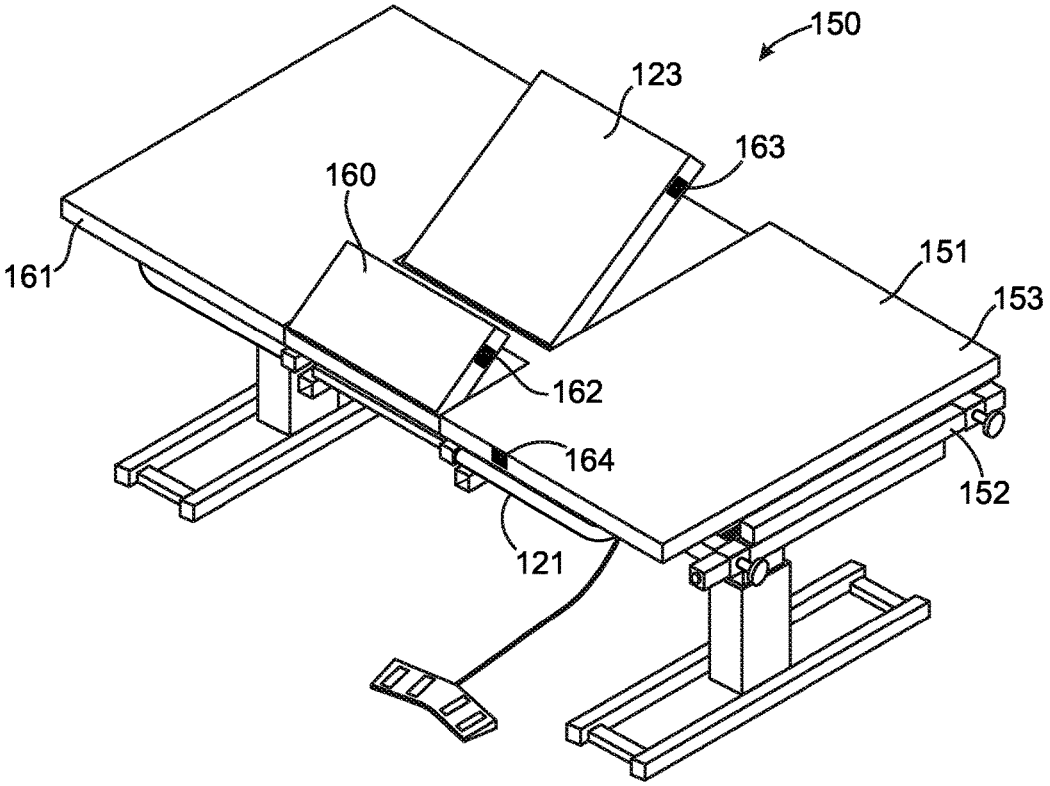
FIG. 12 shows the therapy table of FIG. 11 with the movable seat inclined to assist the patient to the standing position.
Figure 14:
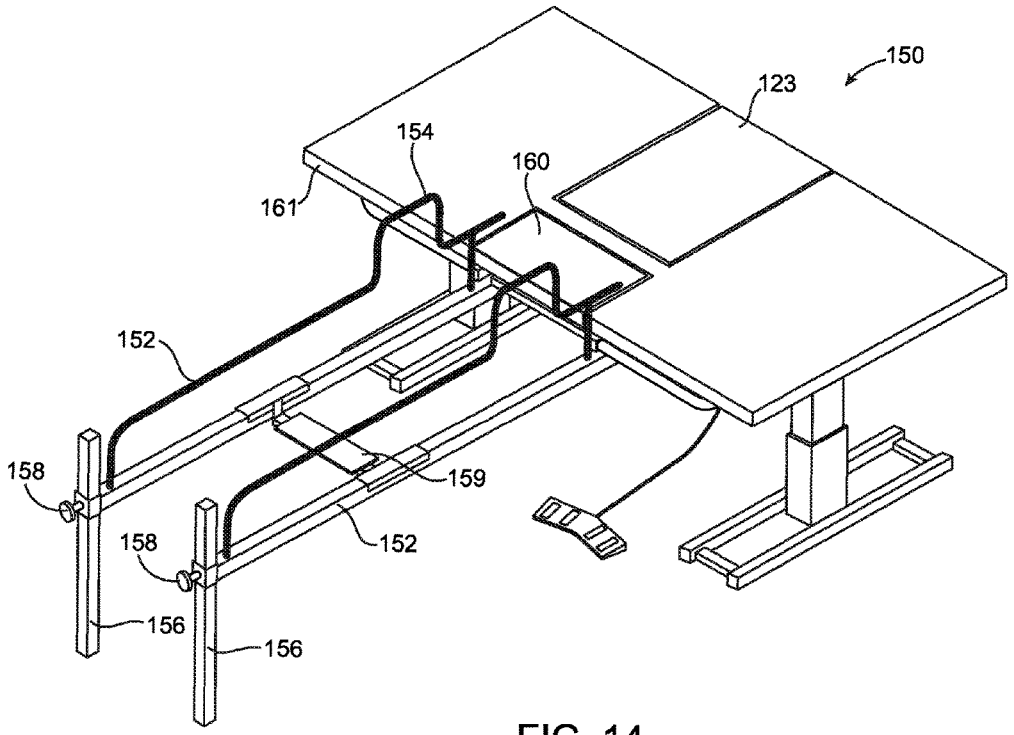
FIG. 14 shows both parallel bars extending from the table.

The table 150 also includes parallel bars 152 which are stowed in FIGS. 11-12 and in a working position in FIGS. 14 and 154. The parallel bars 152 slide into place with the parallel bars 152 each sliding within a channel [153] *155* coupled to the table 150. The parallel bars 152 extend at least 5 feet from an edge of the table 150 and are used to aid the patient in walking.

Figure 13:
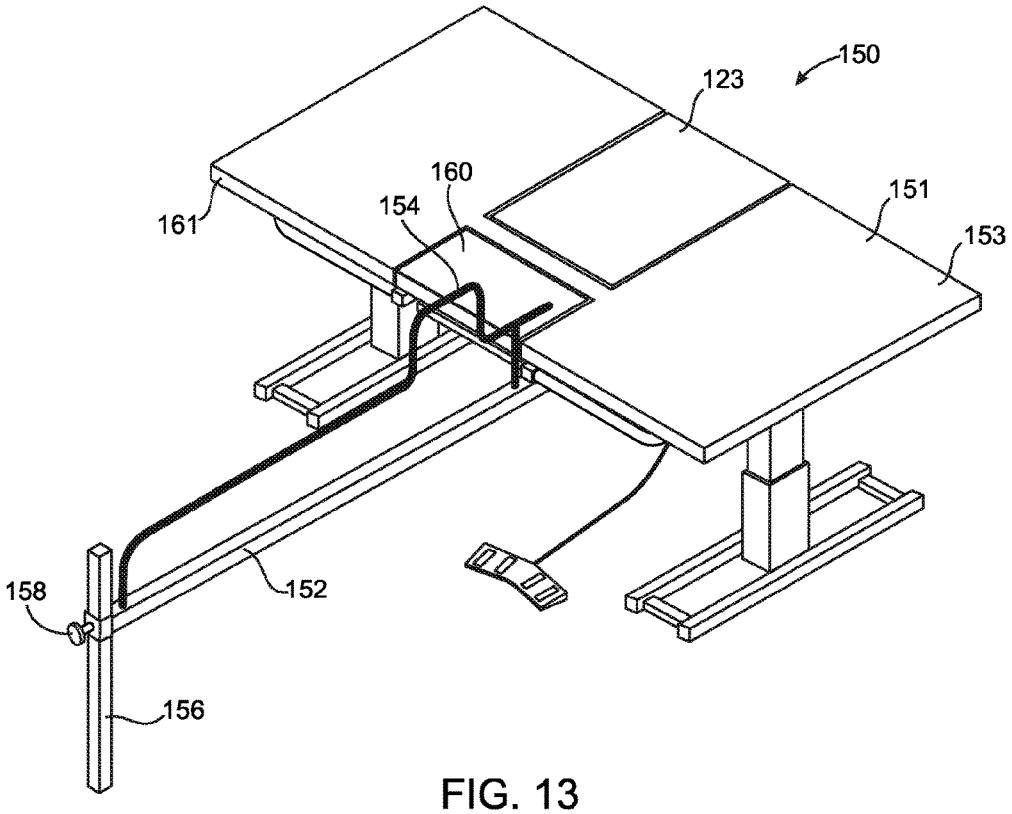
FIG. 13 shows one of the parallel bars extending from the table.

The parallel bars 152 differ from conventional parallel bars in that a proximal portion of the parallel bars 152 include a raised section 154 which is higher than the rest of the parallel bars. The raised section 154 is positioned to assist the patient to the standing position in a manner similar to the transfer bars 121 as described above. The raised section 154 is preferably at least 4 inches higher (and may be about 6.5 inches higher) than the rest of the parallel bars and has a length of at least 5 inches (and may be about 10.5 inches long). The raised section 154 is useful to help the patient or therapist move the patient to the standing position in the same manner that the transfer bars 121 may be used. For example, one of the parallel bars 152 may be engaged with the table (similar to FIG. 5 which has one transfer bar 121 in the working position) so that the therapist or patient may use the parallel bar 152 to help the patient to the standing position as shown in FIG. 13. After the patient has been assisted to the standing position, the other parallel bar 152 may be engaged. The parallel bars 152 include a movable leg 156 with a locking knob 158 so that the leg 156 may have the appropriate length to accommodate the particular table height.

Figure 15:
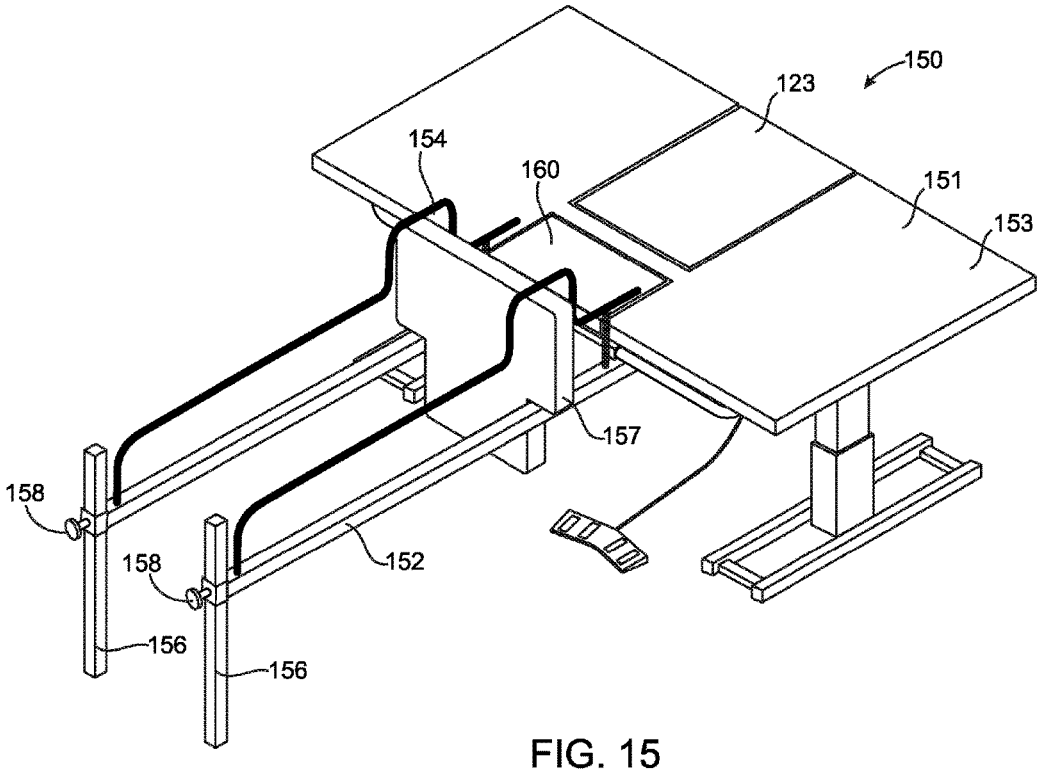
FIG. 15 shows the knee block positioned between the parallel bars.

Referring to FIG. 15, a knee block 157 may also be used to prevent excessive outward movement of the patient's knees as described above. The knee block 157 may be used in the same manner as the knee block 140 and all uses are expressly incorporated here.

Referring still to FIG. 15, a patient support 159 may also be coupled to the parallel bars 152 which may support the patient as necessary while walking and may even support the patient in a seated position if necessary. The patient support 159 may be removed and is preferably slidably coupled to the parallel bars 152 to support the patient at varying positions along the parallel bars 152. In this manner, an attendant may slide the support 159 to trail the patient to provide instant support should the patient begin to fall backward or even forward depending upon where the support 159 is positioned. To this extent, two patient supports 159 may be provided which help prevent the patient from falling forward or backward without departing from the scope of the invention.

Referring again to FIGS. 11-12, the table 150 may also include a movable seat 160 which pivots to aid the patient toward the standing position. The seat 160 is moved with any suitable mechanism such as those described above in connection with the seat back. To this end, an suitable actuator (not shown) is used to move the seat 160 to the desired angle. The movable seat 160, of course, still forms part of the table top 151 and the mat 153 to support the patient in a lying and/or sitting position as necessary and as described herein. The movable seat 160 preferably includes an edge 161 of the therapy table but may also be spaced somewhat from the edge 161 and may be no more than five inches from the edge 161 of the table top 151. The movable seat 160 pivots about an axis 163 which is parallel to an axis 165 about which the seat back 123 pivots.

The table 150 may also include an indication of the various parameters so that the patient's progress may be tracked. The table 150 may also include a first indicator 162 that indicates an angle of the seat 160 relative to the table top 151. The table may also include a second indicator 163 which indicates an angle of the seat back 123 relative to the table top 151. The table 150 also includes a third indicator 164 which indicates a height of the table top 151.

The indicators 162, 163, 164 may be used to assess whether the patient is improving over time. The therapist may have prior information as to the table height and seat angle that was used when moving the patient from a seated position to a standing position. The therapist may then set the seat angle and/or the table height at lower settings to determine whether the patient has improved. For example, the therapist may set the table height to be lower than the table height in a prior therapy session to determine if the patient can still move to a standing position from the lower table height. Similarly, the seat angle may be decreased to determine whether the patient can move to a standing position with the lower seat angle. In this manner, the table may be used to determine whether the patient is improving over time. Finally, the angle of the seat back may also be used to determine whether the patient is improving by determining whether the patient can move to a standing position with a lesser seat back angle relative to a prior session.

Figure 17:
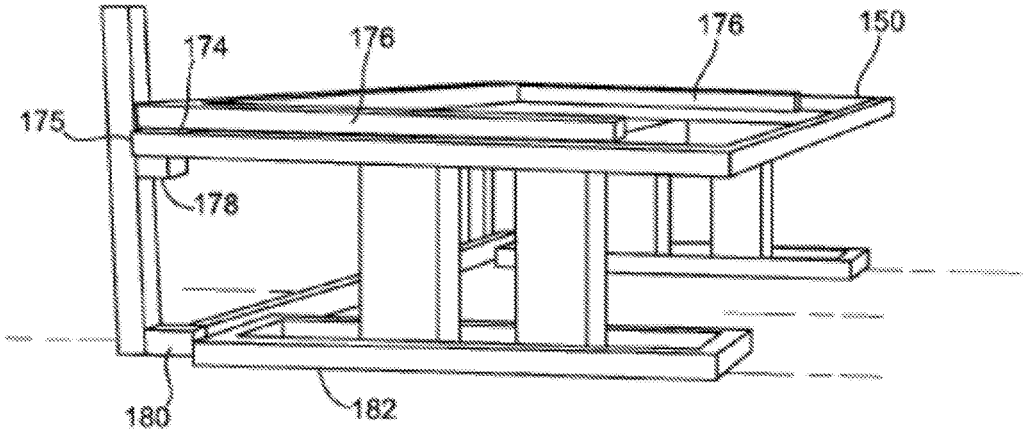
FIG. 17 shows the table carrier engaging a table.

Referring to FIGS. 16-19, a table carrier 170 is shown which is used to transport the table 150 and may be used to transfer other types of tables as well. The carrier 170 includes a frame 172 which supports a plurality of wheels [175] *177*. The frame 172 forms a recess 174 which receives a lateral edge 175 of the table 150. The recess 174 is formed by an elongate upper member 176 which extends over the table 150 and a lower member 178 which engages the underside of the table top 151. The table carrier 170 includes two recesses 174 but may include any number including a single elongate recess 174. The carrier 170 also includes a base contact 180 which engages a base 182 of the table 150 which contacts and rests on the ground. Referring to FIG. 17, the base contact 180 engages the base 182 of the table 150 when the lateral edge 175 of the table 150 is received in the recess 174. The table 150 is then raised by lifting the table 150 from the rear until the carrier 170 and table 150 are supported by the wheels [175] *177*. A pair of rubber feet 184 stabilize the carrier 170 as the table 150 is raised as shown in FIG. 18. Referring to FIG. 19, the table 150 is mounted to the carrier 170 with the wheels [175] *177* engaging the ground and table 150 prepared for transportation. The table 150 is rotated to a substantially perpendicular position when in the transport position of FIG. 19.

By now, those of skill in this art will appreciate that the therapy mat table 10 of the present invention is amenable to many variations and modifications in terms of the methods and materials of its construction without departing from its spirit and scope. For example, most of the parts of the therapy mat table can be separately and inexpensively fabricated by, e.g., injection molding a strong, plastic, such as an acrylic or polyurethane, or the parts may be made from a metal such as aluminum or stainless steel. The table may include a myriad of molded-in functional and decorative details and features. The parts can be assembled together quickly and simply with a minimum number of tools using well-known techniques, molded-in connection features, or the like.

In light of the foregoing, the scope of the present invention should not be limited by that of the particular embodiments described and illustrated herein, as these are merely exemplary in nature. Rather, the scope of the present invention should be commensurate, with that of the claims appended hereafter and their functional equivalents.

What is claimed is:

1. A method of handling a patient on a therapy mat table, comprising the steps of:

providing a therapy table having a mat being large enough to support a patient while the patient is laying down, the therapy table also having a movable seat back, the seat back being movable from a stowed position to a working position, the seat back including a portion of the mat which supports the patient while laying down when in the stowed position, the seat back being positioned to support the patient while sitting on the therapy table when in the working position, the therapy table also having [the] transfer bars being movable from a stowed position beneath the table to a working position, the transfer bars extending above the supporting mat when in the working position to assist in moving the patient on and off the table, the therapy table also having a knee block, the knee block being positioned between the transfer bars when in a working position, wherein the knee block, transfer bars and a lateral edge of the table form an enclosure which encloses a patient;

positioning a patient in a seated position with the patient's back supported by the seat back, the transfer bars being positioned on both sides of the patient when the patient is seated on the therapy table;

positioning the knee block between the transfer bars;

raising the table while the patient is seated to move the patient toward the standing position, wherein the knee block limits outward movement of the patient's knees.

2. The method of claim 1, wherein:

the providing step is carried out with the therapy table having a foot stop, the foot stop being movable from a stowed position to a working position, the foot stop preventing backward movement of a patient's feet when the patient is standing between the transfer bars;

the raising step being carried out with the foot stop being in the working position.

*3. A therapy table, comprising:*

*a mat configured to support a patient in a lying down position on the therapy table;*

*a seat back configured to be movable between a lowered seat back position and a raised seat back position, the seat back comprising a portion of the mat when the seat back is in the lowered seat back position, and the seat back configured to support a patient in a seated position on the therapy table when the seat back is the raised seat back position,*

*a pair of transfer bars configured to be movable between a stowed position and a working position, the transfer bars configured to assist in moving a patient on and off the table when the seat back is in the raised position and the transfer bars are in the working position, wherein at least a portion of the transfer bars extend above at least a portion of the mat when the transfer bars are in the working position, and wherein the transfer bars are stored below the mat when the transfer bars are in their stowed position; and*

*a knee block configured to be positioned between the transfer bars when the transfer bars are in the working position, wherein the knee block is configured to limit outward movement of a patient's knees when the table is raised to move the patient from a seated position to a standing position;*

*wherein when the transfer bars are in the working position, and the knee block is positioned between the transfer bars, the transfer bars and a lateral edge of the table form an enclosure to accommodate a patient;*

*wherein the mat includes first and second end portions that are not next to one another, and third and fourth middle portions that are next to one another and are between the first and second end portions;*

*wherein the third portion of the mat, which is the portion of the mat that provides the seat back, is pivotable between the lowered seat back position and the raised seat back position;*

*wherein the fourth portion of the mat, which is next to the third portion of the mat, provides a seat that is pivotable between a lowered seat position and a raised seat position to aid a patient with moving from a seated position to a standing position; and*

*wherein an edge of the fourth portion of the mat, which provides the seat, is raised above an edge of the third portion of the mat, which provides the seat back, when the third portion of the mat is in the raised seat back position and the fourth portion of the mat is in the raised seat position.*

*4. The therapy table of claim 3, wherein an axis about which the fourth portion of the mat pivots, when the seat that is provided by the fourth portion of the mat moves between the lowered seat position and the raised seat position, extends between the first and second end portions of the mat.*

*5. The therapy table of claim 3, wherein an axis about which the third portion of the mat pivots, when the seat back that is provided by the third portion of the mat moves between the lowered seat back position and the raised seat back position, extends between the first and second end portions of the mat.*

*6. The therapy table of claim 5, wherein:*

*the first and second end portions of the mat remain substantially parallel to a floor or ground upon which the table is supported; and*

*the third portion of the mat, which is the portion of the mat that provides the seat back, is substantially coplanar with the first and second end portions of the mat when the third portion of the mat is in the lowered seat back position, and is at a non-zero angle relative the first and second end portions of the mat when the third portion of the mat is in the raised seat back position.*

*7. The therapy table of claim 6, wherein the fourth portion of the mat, which is the portion of the mat that provides the seat, is substantially coplanar with the first and second end portions of the mat when the fourth portion of the mat is in the lowered seat position, and is at a non-zero angle relative the first and second end portions of the mat when the fourth portion of the mat is in the raised seat position.*

*8. The therapy table of claim 7, wherein an axis about which the fourth portion of the mat pivots is parallel to the axis about which the third portion of the mat pivots.*

*9. The therapy table of claim 3, further comprising:*

*a seat back operator configured to be controlled to move the seat back between the lowered seat position and the raised seat position, as well as at least one intermediate position between the lowered position and the raised position.*

*10. The therapy table of claim 9, wherein the seat back operator comprises an electric motor, a hydraulic, or a combination an electric and hydraulic motor.*

*11. The therapy table of claim 3, wherein an entire upper portion of the table is configured to be controllably raised and lowered relative to a floor or ground upon which the table is supported.*

*12. The therapy table of claim 3, wherein while the transfer bars are in the working position:*

*each of the transfer bars includes a low bar portion and high bar portion that is higher than the low bar portion relative to a floor or ground upon which the therapy table is supported;*

*an entirety of the low bar portion of each of the transfer bars extends over the mat; and at least a portion of the high bar portion of each of the transfer bars extends beyond a lateral edge of the mat.*

*13. A therapy table, comprising:*

*a mat including first and second end portions that are not next to one another, and third and fourth middle portions that are next to one another and are between the first and second end portions;*

*the third portion of the mat configured to be pivotable between a lowered seat back position and a raised seat back position;*

*the fourth portion of the mat configured to be pivotable between a lowered seat position and a raised seat position;*

*the first, second, third and fourth portions of the mat configured to support a patient in a lying down position on the therapy table when the third portion of the mat is in the lowered seat back position and the fourth portion of the mat is in the lowered seat position;*

*the third portion of the mat providing a seat back and configured to support a patient in a seated position on the therapy table when the third portion of the mat is the raised seat back position;*

*the fourth portion of the mat, which is next to the third portion of the mat, configured to provide a seat for a patient to sit on when the third portion of the mat is in the raised position and the patient is sitting on the fourth portion of the mat with the patient's back resting against the third portion of the mat;*

*the fourth portion of the mat also configured to aid a patient with moving from a seated position to a standing position when pivoted between the lowered seat position and the raised seat position;*

*a pair of transfer bars configured to assist in moving a patient on and off the table when a patient is sitting on the fourth portion of the mat and the third portion of the mat is in the raised seat back position;*

*a knee block configured to be positioned between the transfer bars and to limit outward movement of a patient's knees when a patient is being moved from a seated position to a standing position;*

*when the transfer bars are in a working position, and the knee block is positioned between the transfer bars, the transfer bars and a lateral edge of the table form an enclosure to accommodate a patient*

*the transfer bars, the knee block, and a lateral edge of the fourth portion of the mat forming an enclosure to accommodate a patient when the knee block is positioned between the transfer bars; and*

*an edge of the fourth portion of the mat, which provides the seat, is configured to be raised above an edge of the third portion of the mat, which provides the seat back, when the third portion of the mat is in the raised seat back position and the fourth portion of the mat is in the raised seat position.*

*14. The therapy table of claim 13, wherein:*

*the first and second end portions of the mat remain substantially parallel to a floor or ground upon which the table is supported; and*

*the third portion of the mat, which is the portion of the mat that provides the seat back, is substantially coplanar with the first and second end portions of the mat when the third portion of the mat is in the lowered seat back position, and is at a non-zero angle relative the first and second end portions of the mat when the seat back is in the raised seat back position.*

*15. The therapy table of claim 14, wherein the fourth portion of the mat, which is the portion of the mat that provides the seat, is substantially coplanar with the first and second end portions of the mat when the fourth portion of the mat is in the lowered seat position, and is at a non-zero angle relative the first and second end portions of the mat when the fourth portion of the mat is in the raised seat position.*

*16. The therapy table of claim 13, wherein:*

*the pair of transfer bars are configured to be movable between a stowed position and the working position;*

*the knee block is configured to be positioned between the transfer bars when the transfer bars are in the working position;*

*wherein at least a portion of the transfer bars extend above at least a portion of the mat when the transfer bars are in the working position;*

*wherein the transfer bars are stored below the mat when the transfer bars are in the stowed position.*

*17. The therapy table of claim 16, wherein while the transfer bars are in the working position:*

*each of the transfer bars includes a low bar portion and high bar portion that is higher than the low bar portion relative to a floor or ground upon which the therapy table is supported;*

*at least a portion of the low bar portion of each of the transfer bars extends over the mat; and*

*at least a portion of the high bar portion of each of the transfer bars extends beyond a lateral edge of the mat.*

*18. The therapy table of claim 16, further comprising:*

*a foot stop configured to be movable from a stowed position to a working position, the foot stop configured to limit backward movement of a patient's feet when the patient moves from a sitting position on the therapy table to a standing position between the transfer bars.*

*19. The therapy table of claim 13, further comprising:*

*a pair of bars that are configured to be stowed in a portion of the table that is below the mat, and configured to be attached to a portion of the table such that the bars extend at least five feet from a portion of the table that supports the mat;*

*wherein the bars are configured to aid a patient in walking after the patent has moved from a sitting position on the therapy table to a standing position.*

*20. The therapy table of claim 19, wherein each of the bars includes a raised section that is at least four inches higher than a rest of the bar and is positioned to assist a patient in moving from a sitting position on the therapy table to a standing position between the pair of bars.*

* * * * *